July 7, 1942.   C. HEDDON   2,289,265
FISH BAIT
Filed Oct. 4, 1940
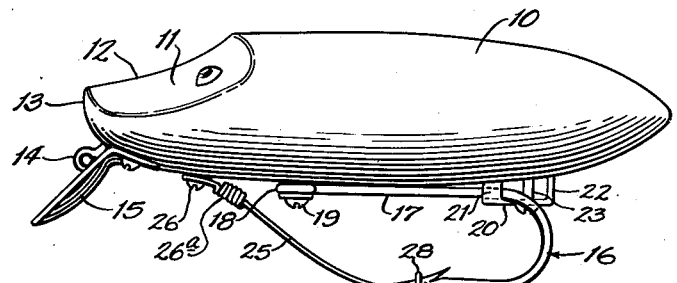
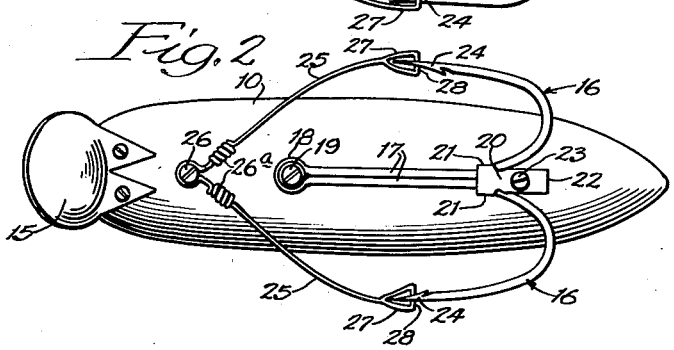
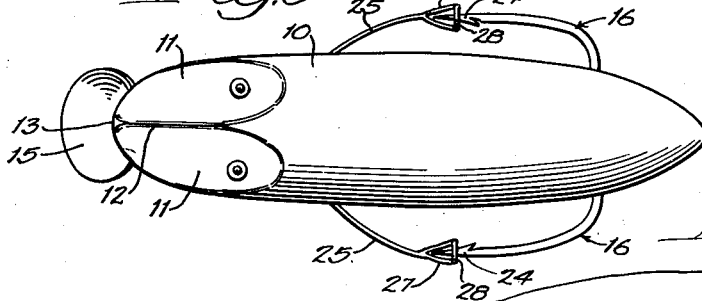
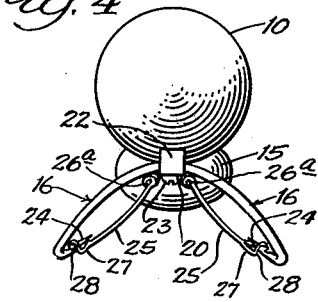
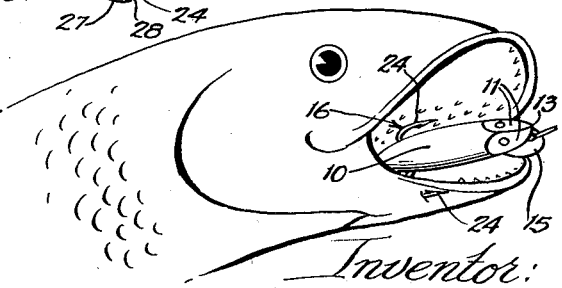
Inventor:
Charles Heddon,
By Blimmy & Blimmy
Attorneys.

Patented July 7, 1942

2,289,265

UNITED STATES PATENT OFFICE 2,289,265

FISH BAIT

Charles Heddon, Dowagiac, Mich., assignor to James Heddon's Sons, Dowagiac, Mich., a corporation of Michigan Application October 4, 1940, Serial No. 359,711

2 Claims. (Cl. 43—46)

The fish bait of the present invention is in the form of a plug having at least two hook points extending laterally beyond the body of the bait and rigidly secured to the body and effectively guarded against fouling by weeds or other obstructions.

By mounting the hooks rigidly in the manner hereinafter described, they will at all times maintain their intended position with relation to the bait body and will project laterally therefrom in a manner highly effective in the hooking of game fish; also the rigid arrangement of the hooks with relation to the guards insures that the guard prongs will be sprung inwardly by the strike of the fish to effectively expose the hook points.

Further objects and details will appear from the description of the invention in conjunction with the accompanying drawing, wherein—

Figure 1 is a side elevation of the bait;

Fig. 2 is a bottom view thereof;

Fig. 3 is a top view thereof;

Fig. 4 is a rear end view thereof; and

Fig. 5 is a view illustrating the manner in which the hook points are presented during the strike of a fish.

The bait comprises a body 10 of conventional oval form and in the general contour of a stubby cigar, which at its forward end is provided with dished cheek portions 11 merging into a center ridge 12 terminating in a nose 13. Beneath the nose is provided a line tie 14 and a forwardly and downwardly extending dished spoon 15 which constitutes the actuating device for imparting the desired movements to the bait. In respect to the above features, the bait follows the conventional practice.

The bait is provided with two hooks 16 which are preferably integrally formed, having shanks 17 which lie in close relation to one another and terminate at the forward end in an eye or loop 18 through which is entered a screw 19 for securing the twin hooks to the under side of the body at a point about one-third the distance rearwardly from the nose of the bait.

The hooks are secured at a point immediately in advance of their bent rear ends by a clip 20 which is provided with upwardly turned tongues 21 which embrace the shanks at the point where they begin to diverge into the reversely bent rear portions of the hooks. The clip at its rear end terminates in an inwardly bent leg 22 which engages the rounded body of the bait, and the clip is secured by means of a screw 23.

The bent rear portions of the hooks diverge laterally and downwardly with the barbed points 24 recurved and projecting forwardly, and as shown in Fig. 4 the spread of the barbed portions of the hooks is sufficient to bring them on each side well beyond the sides of the bait body, as best shown in Figs. 3 and 4, so that a fish, in rushing for the bait, will find the hooks presented laterally in position to clear the surface of the body to a substantial degree. The barbed tips of the hooks extend well forwardly to a position slightly to the rear of the middle of the body.

The barbed tips of the hooks are guarded by wire prongs 25 which converge at their forward ends and are there united and held in position by a screw 26 which hold the prongs in close abutment with the body near its forward end, each prong being formed of wire having near its forward end a spring coil 26ª to afford the requisite degree of flexibility to enable the prongs to yield under the impact of a strike to expose the hook points. The free end of each prong is provided with a Y-shaped tip guard 27, the side legs of which are connected by a bridge portion 28 which rounds up over the barbed tip of the associated hook to afford a saddle which straddles the tip point and serves to maintain the guard prong in proper relation to the hook. Each of the prongs is bowed downwardly in arcuate formation, and the lateral spread of the prongs is of course substantially equal to the lateral spread of the hooks, so that the weeds or other obstructions will be deflected laterally beyond the sides of the bait body as the bait is drawn through the water.

The lateral spread of the hooks on either side of the body and their lateral attachment thereto provide an arrangement which holds the hooks against lateral deflection during the strike of the fish from whatsoever angle of approach, so that as the fish's jaws close upon the bait body the guard prongs will be displaced and the hook points exposed in a much more effective manner than is possible in the case of hook gangs which are loosely hung from the bait body and are frequently displaced by the impact of the fish without hooking into the fish's jaws.

It will be understood that the specific details of construction heretofore described serve merely to exemplify a preferred form of the invention and that modifications may be made in such details without departing from the spirit of the invention, which consists essentially in the disposition of hooks rigidly connected to the plug body in such a way as to present their points laterally beyond the body, so that a game fish striking at the bait from the side, which is the usual angle of approach, when it closes its jaws upon the bait, will strike its upper jaw into the unyielding surface of the bait body and force one or both of the laterally projected hook points into the lower jaw or contiguous portion of the fish's mouth, thereby insuring the setting of the hooks by the impact of the strike, so that it will be impossible for the fish to disgorge the bait even though the fisherman be tardy in his attempt to set the hook. The disposition of the hooks, therefore, renders it impossible for the fish to close its jaws on the bait from any angle or position without the flesh coming in contact with one or both of the hook points. In other words, the position of the hook points, as related to the back or top of the plug bait, constituting a triangle of contact or resistance, renders it practically impossible for the fish to take the bait into its mouth without setting the hooks. The bait of the present invention, therefore, differs essentially from baits which employ a gang of hooks loosely hung from the plug body in the conventional manner, or a bait which employs but a single hook rigidly attached to a spoon or the like.

In the case of a loosely hung gang, the impact of the strike frequently swings the hook gang to one side so that the fish's jaws may close upon the body without being impaled upon the hooks. In the case of a single hook, it may well happen that the jaws will close upon the sides of the bait body without engaging the hook, but in the case of the present invention, the unyielding projection of the hook points and the duplication of hook points on opposite sides of the body serve to make it practically impossible for the fish to strike the bait without setting the hooks. At the same time the rigid attachment of the weed guard prongs to the unyielding body of the bait rather than to flexibly attached hooks or the like insures the displacement of the prongs and the exposure of the hook points by the closing of the fish's jaws from any angle of attack, so that the prongs may be made sufficiently stiff to effectively guard the hook points, without, however, in any way interfering with the effective setting of the hooks.

Experience has shown that the bait of the present invention insures a much higher percentage of hooked fish in ratio to the number of strikes than is possible even with the skillful use of plug baits of the conventional character having loosely mounted hooks or gangs, when such gang hooks are equipped with weed guards.

I claim:

1. A fish bait comprising a body having integrally connected twin hooks lying closely adjacent the under side of the body with their shanks lying in close parallel relation to one another and terminating at their forward ends in a loop, attaching means entered through said loop, additional attaching means embracing the rear portions of the shanks for holding the hooks in fixed relation to the body, the rear bent portions of the hooks diverging laterally and downwardly to present their tips beyond the sides of the body, and flexible guard prongs fixedly secured at their forward ends to the under side of the forward portion of the body and diverging rearwardly and downwardly to present their free ends in close relation to the tips of the respective hooks.

2. A fish bait comprising a body having twin hooks lying closely adjacent the under side of the body with their shanks lying in close parallel relation to one another, means for attaching the forward ends of the hooks rigidly to the body, additional attaching means embracing the rear portions of the shanks for holding the hooks in fixed relation to the body, the rear bent portions of the hooks diverging laterally and downwardly to present their tips beyond the sides of the body, and guard prongs secured at their forward ends to the under side of the forward portion of the body and diverging rearwardly and downwardly to present their free ends in close relation to the tips of the respective hooks.

CHARLES HEDDON.